United States Patent [19]
Gies et al.

[11] Patent Number: 5,665,265
[45] Date of Patent: Sep. 9, 1997

US005665265A

[54] NON WOVEN GEL ELECTROLYTE FOR ELECTROCHEMICAL CELLS

[75] Inventors: Paul J. Gies, Atlanta; Manuel Oliver, Duluth, both of Ga.; Florence O. Eschbach, Santa Clara, Calif.; Veronica R. Reichert, Bethlehem; Christen E. Coalson, Atlanta, both of Ga.

[73] Assignee: Motorola, Inc., Schaumburg, Ill.

[21] Appl. No.: 727,352

[22] Filed: Sep. 23, 1996

[51] Int. Cl.$^6$ .................... H01M 10/40; H01G 9/025
[52] U.S. Cl. .................... 252/62.2; 429/190; 429/192
[58] Field of Search .................... 429/190, 192; 252/62.2

[56] References Cited

U.S. PATENT DOCUMENTS

| | | | |
|---|---|---|---|
| 3,918,995 | 11/1975 | Palmer et al. | 429/248 |
| 3,947,537 | 3/1976 | Buntin et al. | 264/137 |
| 5,456,000 | 10/1995 | Gozdz et al. | 29/623.2 |
| 5,478,668 | 12/1995 | Gozdz et al. | 429/127 |
| 5,597,659 | 1/1997 | Morigaki et al. | 429/190 |
| 5,605,549 | 2/1997 | Zucker | 429/190 |

*Primary Examiner*—Alan Diamond
*Attorney, Agent, or Firm*—Ken Massaroni

[57] ABSTRACT

An electrolyte system (40) for use in connection with an electrochemical cell (10). The cell (10) includes a positive electrode (20) and a negative electrode (30) with the electrolyte system (40) disposed therebetween. The electrolyte system is a polymer gel electrolyte system including a liquid electrolyte species which may be either aqueous or non-aqueous and a polymer gel electrolyte support structure. The polymer gel electrolyte support structure includes at least an non woven first polymer and a second polymer which is adapted to absorb the electrolyte active species. The first polymer is a fibrous polymer to reduce swelling of the gel electrolyte in the presence of the electrolyte active species, and further to enhance mechanical integrity of the support structure.

14 Claims, 3 Drawing Sheets

NON WOVEN GEL ELECTROLYTE FOR ELECTROCHEMICAL CELLS

TECHNICAL FIELD

This invention relates in general to electrochemical cells, such as electrochemical battery cells. The invention relates more particularly to the field of electrolytes for electrochemical cells, and specifically to polymer electrolytes for such cells.

BACKGROUND OF THE INVENTION

There has been a great deal of interest in developing better and more efficient methods for storing energy for applications such as radio communication, satellites, portable computers, and electric vehicles to name but a few. Accordingly, there have been recent concerted efforts to develop high energy, cost effective batteries having improved performance characteristics.

Rechargeable, or secondary cells are more desirable than primary (non-rechargeable) cells since the associated chemical reactions which take place at the positive and negative electrodes of the battery are reversible. Electrodes for secondary cells are capable of being regenerated (i.e. recharged) many times by the application of an electrical charge thereto. Numerous advanced electrode systems have been developed for storing electrical charge. Concurrently, much effort has been dedicated to the development of electrolytes capable of enhancing the capabilities of electrochemical cells.

Heretofore, electrolytes have been either liquid electrolytes as are found in conventional wet cell batteries, or solid films as are available in newer, more advanced battery systems. Each of these systems have inherent limitations, and related deficiencies which make them unsuitable for various applications.

Liquid electrolytes, while demonstrating acceptable ionic conductivity, tend to leak out of the cells into which they are sealed. While better manufacturing techniques have lessened the occurrence of leakage, cells still do leak potentially dangerous liquid electrolytes from time to time. Moreover, any electrolyte leakage lessens the amount of electrolyte available, thus reducing the effectiveness of the cell. Cells using liquid electrolytes are also not available for all sizes and shapes of batteries.

Conversely, solid electrolytes are free from problems of leakage. However, they have vastly inferior properties as compared to liquid electrolytes. For example, conventional solid electrolytes have ionic conductivities in the range of $10^{-5}$ S/cm (Siemens per centimeter), whereas acceptable ionic conductivity is $>10^{-3}$ S/cm. Good ionic conductivity is necessary to ensure a battery system capable of delivering usable amounts of power for a given application and is necessary for the high rate operation demanded by, for example, cellular telephones, power tools, and satellites. Accordingly, solid electrolytes are not adequate for many high performance battery systems.

While solid electrolytes are intended to replace the combination of liquid electrolytes and separators used in conventional batteries, the limitations described hereinabove have prevented them from being fully implemented. One class of solid electrolytes, specifically gel electrolytes, have shown some promise. Gel electrolytes contain a significant fraction of solvents (or plasticizers) in addition to the salt and polymer of the electrolyte itself. One processing route that can be used to assemble a battery with a gel electrolyte is to leave out the solvent until after the cell is fabricated. The cell may then be immersed in the solvent and a gel is formed as the solvent is absorbed. Two problems, however, may arise during solvent absorption: (1) the gel electrolyte may lack sufficient mechanical integrity to prevent shorting between the electrodes; and/or (2) excessive swelling accompanies the gel formation. Each of these problems is a significant limitation to the successful implementation of gel electrolytes in electrochemical cells.

The problems identified above are related to the fact that the gel does not contain sufficient porosity prior to immersion in the electrolyte active material. This results in excessive swelling leading to the aforementioned problems. This has been addressed in, for example, U.S. Pat. No. 5,460,904, which describes a process in which the gelling solvent used in forming the gel is subsequently extracted. The process, while creating desired porosity, is expensive and difficult to accomplish repeatedly.

Accordingly, there exists a need for a new electrolyte system which combines the properties of good mechanical integrity, as well as the ability to absorb sufficient amounts of liquid electrolytes so as to produce an electrolyte with the high ionic conductivity of liquid electrolytes. The electrolytes so formed should also avoid excessive swelling, and all the problems associated therewith.

DETAILED DESCRIPTION OF THE PREFERRED EMBODIMENT

Figure 1:
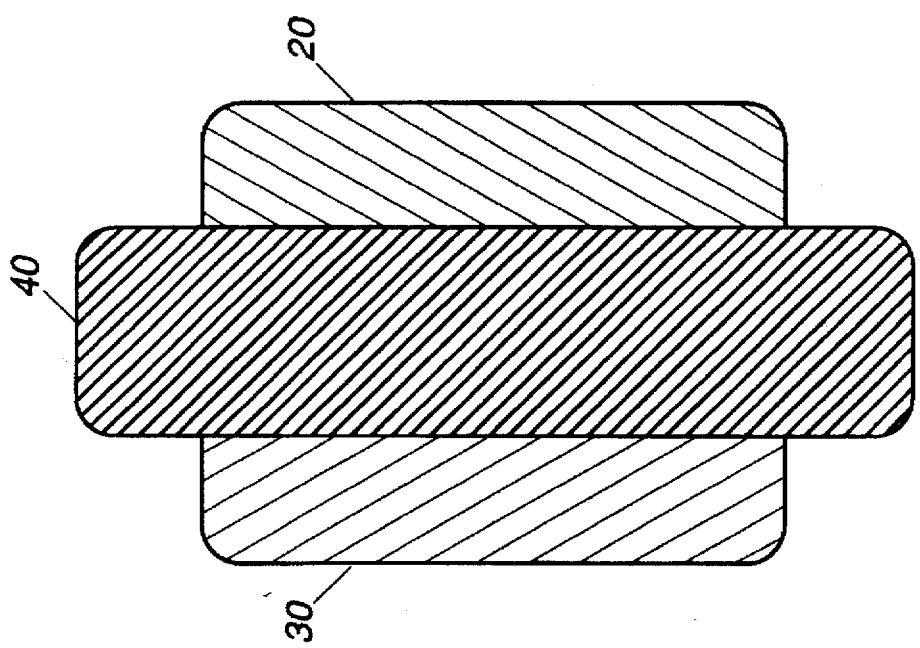
FIG. 1 is a schematic representation of an electrochemical cell in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic representation of an electrochemical cell in accordance with the instant invention. The cell 10 includes a positive electrode 20 and a negative electrode 30. The positive electrode 20 may be fabricated of any of a number of chemical systems known to those of ordinary skill in the art. Examples of such systems include manganese oxide, nickel oxide, cobalt oxide, vanadium oxide, and combinations thereof. In one preferred embodiment, the positive electrode is fabricated of a lithiated nickel oxide material such as that disclosed in commonly assigned, co-pending U.S. patent application Ser. No. 08/464,440 in the name of Zhenhua Mao filed Jun. 5, 1995, the disclosure of which is incorporated herein by reference.

The negative electrode 30 may likewise be fabricated from any of a number of electrode materials known to those of ordinary skill in the art. Selection of the negative electrode material is dependent on the selection of the positive electrode so as to assure an electrochemical cell which will function properly for a given application. In this context, the negative electrode may be fabricated from alkali metals, alkali metal alloys, carbon, graphite, petroleum coke, and combinations thereof. The types of negative and positive electrode materials recited above are typically associated with lithium battery cells. In one preferred embodiment, the negative electrode is fabricated of an activated carbon material such as that disclosed in commonly assigned, co-pending U.S. patent application Ser. No. 08/561,641 entitled "Improved Carbon Electrode Materials For Lithium Battery Cells And Method of Making Same" filed on Nov. 22, 1995, in the names of Jinshan Zhang, et al., the disclosure of which is incorporated herein by reference.

It is to be noted however that the invention is not so limited; the polymer electrolyte system of the instant invention may be advantageously employed with nickel-cadmium, nickel-metal hydride, lead-acid, or any other battery system.

Operatively disposed between the positive 20 and negative 30 electrodes is an electrolyte system 40. The electrolyte system 40 comprises a polymeric support structure including at least two polymers. The polymeric support structure includes a non woven polymeric host matrix having a gelling polymer introduced thereinto, as well as an electrolyte active species dispersed throughout. The two polymers are two distinct phases, and as such are distinguishable from co-polymers used in the prior art.

As used herein, the term "non woven" refers to that class of polymeric materials which are porous fabric materials composed of fibers assembled into webs. In contrast to woven fabrics which are manufactured by processes such as weaving, knitting or spinning, non woven materials are processed into isotropic fabrics by arranging the fibers more or less randomly. Non wovens are typically formed in a three step process: web forming, web bonding and a final finishing step. Web forming involves the creation of a loosely held structure, which is subsequently bonded by a thermal, mechanical or chemical process. The final step involves lamination or calendaring of the web into a thin sheet.

The non woven polymeric host matrix provides mechanical stability to the entire electrolyte system, while discouraging swelling during the absorption of the electrolyte active species. This is due to the fact that the non woven polymer is a fibrous material which does not absorb the electrolyte active species, and hence does not swell. Moreover, since it is a fiber, the non woven limits the amount of lateral or thickness expansion which occurs when the gelling polymer absorbs the electrolyte active species. Preferred materials which may be used as the non woven polymer include materials selected from the group comprising polyethylene, polypropylene, polytetrafluoroethylene, polystyrene, polyethyleneterephthalate, nylon, and combinations thereof. In one particularly preferred embodiment, the non woven polymer is polypropylene.

The gelling polymer is, conversely, adapted to absorb the electrolyte active species, and hence expand or swell on absorption. The gelling polymer may be either a powdered or fibrous polymer which expands into the voids between the non woven fibers upon uptake or absorption of the electrolyte active species. Accordingly, preferred gelling polymers are selected from the group of materials consisting of polyvinylidene fluoride (PVDF), polyurethane, polyethylene oxide, polyacrylonitrile, polymethylmethacrylate, polyacrylamide, polyvinyl acetate, polyvinylpyrrolidinone, polytetraethylene glycol diacrylate, copolymers of any of the foregoing, and combinations thereof. In one particularly preferred embodiment, the gelling polymer is PVDF. The gelling polymer typically comprises between 10 and 40% of the polymers in the electrolyte system, and preferably between 15 and 25%.

The electrolyte active species is a liquid or solid component (or both) which provides ionic conductivity between the anode and the cathode. In the embodiment in which the electrochemical cell 10 is a lithium intercalation cell, the electrolyte active species consists of a alkali metal salt in a solvent. Typical alkali metal salts include, but are not limited to, salts having the formula $M^+X^-$ where $M^+$ is an alkali metal cation such as $Li^+$, $Na^+$, $K^+$, and combinations thereof; and $X^-$ is an anion such as. $Cl^-$, $Br^-$, $I^-$, $ClO_4^-$, $BF_4^-$, $PF_6^-$, $AsF_6^-$, $SbF_6^-$, $CH_3CO_2^-$, $CF_3SO_3^-$, $N(CF_3SO_2)_2^-$, $C(CF_3SO_2)_2^-$ and combinations thereof. The solvent into which the salt is dispersed is typically an organic solvent including, but not limited to, propylene carbonate (PC), ethylene carbonate (EC), diethyl carbonate (DEC), dimethyl carbonate, dipropylcarbonate, dimethylsulfoxide, acetonitrile, dimethoxyethane, tetrahydrofuran, n-methyl-2-pyrrolidone (NMP), acetone, methylethyl ketone, and combinations thereof. For other electrode combinations, i.e., Ni-Cd or Ni-metal hydride, other electrolyte active species may be used, such as KOH.

As noted above, in the fabrication of polymer gel electrolytes, two problems arise during solvent absorption. The first problem relates to the lack of sufficient mechanical integrity to prevent electrical shorting between the electrodes and the second problem relates to excessive swelling which often accompanies the gel formation as the gel is being immersed in the liquid electrolyte species. The instant polymer electrolyte system solves these problems by providing a polymer blend, such as a two phase polymer blend, in which at least one polymer is provided for purposes of absorbing the electrolyte active species, while at least a second polymer, which either does not absorb electrolytes or at best absorbs very little electrolyte, provides mechanical integrity. As the mechanical integrity is improved, shorting between the electrodes is reduced or eliminated.

At least three types of non woven electrolyte structures are contemplated by the invention. The first includes a single fiber of a blend combining an inert with a gelling polymer. An example of this type would be poly(vinylidene fluoride) ("PVDF") as the gelling polymer combined with an inert polypropylene ("PP"). A second type would be two types of polymer fibers, one inert and one gelling, interwoven. An example of this type would be PVDF and PP fibers interwoven. The third type would be one inert fiber and one gelling polymer powder, for example a PP fiber and a PVDF powder.

The invention may be further appreciated by the examples provided hereinbelow.

EXAMPLES

EXAMPLE I

A spun bonded polypropylene (PP) film of 35 µm thickness (the non woven polymer) was dip coated in a solution of 11 wt % PVDF (the gelling polymer) dissolved in a 50/50 mixture of acetone and NMP. The dried, coated membrane was flattened at 100° C. under 2000 lbs. pressure. The total thickness of the processed PVDF layer was 40 µm (20 µm on each side of the PP). The coated membrane was swollen in PC/EC/LiPF$_6$ (1M) electrolyte active species at 100° C. The ionic conductivity of the electrolyte active species was 4.7 E-4 siemens per centimeter (S/cm). Swelling of the total system was 130 wt %, based on the total weight of the coated film (163 wt % of the PVDF component) after 1 minute 15 seconds. The liquid electrolyte uptake was 13.5 wt % based on the total weight of the coated film, indicating that the porosity of the coated film was negligible.

An electrochemical cell using a carbon anode fabricated of SFG-44bought from Timcal, and a cathode of commercially available LiCoO$_2$, with the above described electrolyte system disposed therebetween. The cell was laminated at 150° C. with 5 lbs pressure for 1 minute followed by application of 500 lbs pressure for 10 seconds. The laminated structure was dried in a glove box at 70° C. for 24 hours, and subsequently soaked in 1M EC/DEC/DMC/LiPF$_6$ solution at room temperature for 10 minutes. The total absorption was 298 wt % based on the weight of the PVDF. 300 wt % is the limit of absorption before PVDF begins to dissolve.

Figure 2:
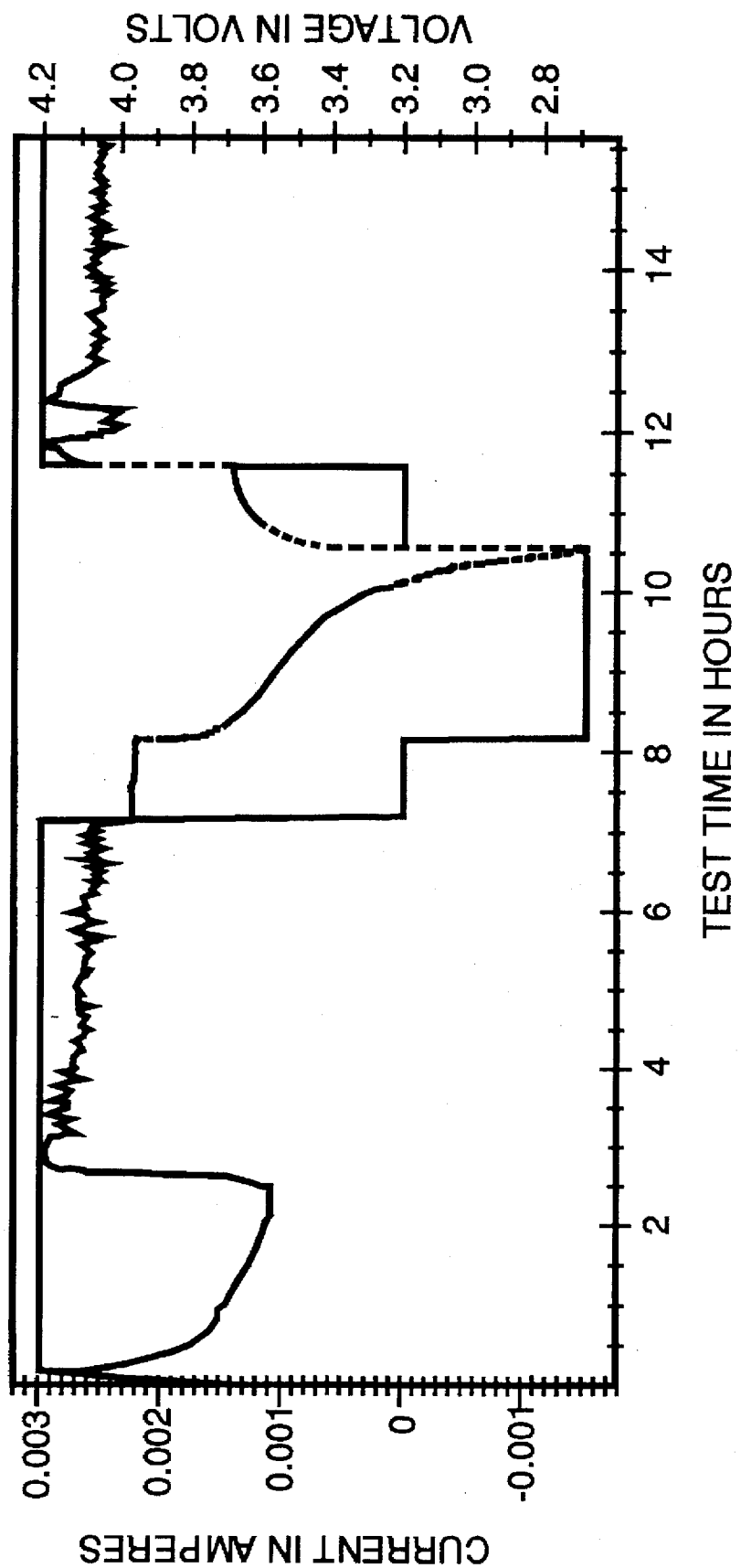
FIG. 2 is a chart illustrating cycling data for a cell with an electrolyte, in accordance with the invention.

The stacked anode-electrolyte-cathode was packed in a heat sealable, aluminum laminate packing material and thermally treated for 10 minutes at 100° C. to gel the PVDF component of the electrolyte. The cell's electrochemical performance was then measured. Open circuit voltage of the cell before gelling was 15 millivolts (mV) and increased to 105 mV following gelling. Cycling data is provided in FIG. 2, which shows that the structure may have suffered from some degree of short circuiting.

EXAMPLE II

A spunbonded polypropylene/polyethylene film of 95 microns thickness (the non woven polymer) was coated with an aqueous solution of PVDF and sodium carboxymethyl cellulose. The coating was applied in a 15 mg/cm² application comprising of 14 mg/cm² of PVDF and 1 mg/cm² of sodium carboxymethyl cellulose. The sodium carboxymethyl cellulose was provided as a binder to assist in adhering the PVDF to the non woven polymer. The coated non woven was compressed to force the coating into the non woven structure. The overall thickness of the coated non woven was 107.5 microns.

Figure 3:
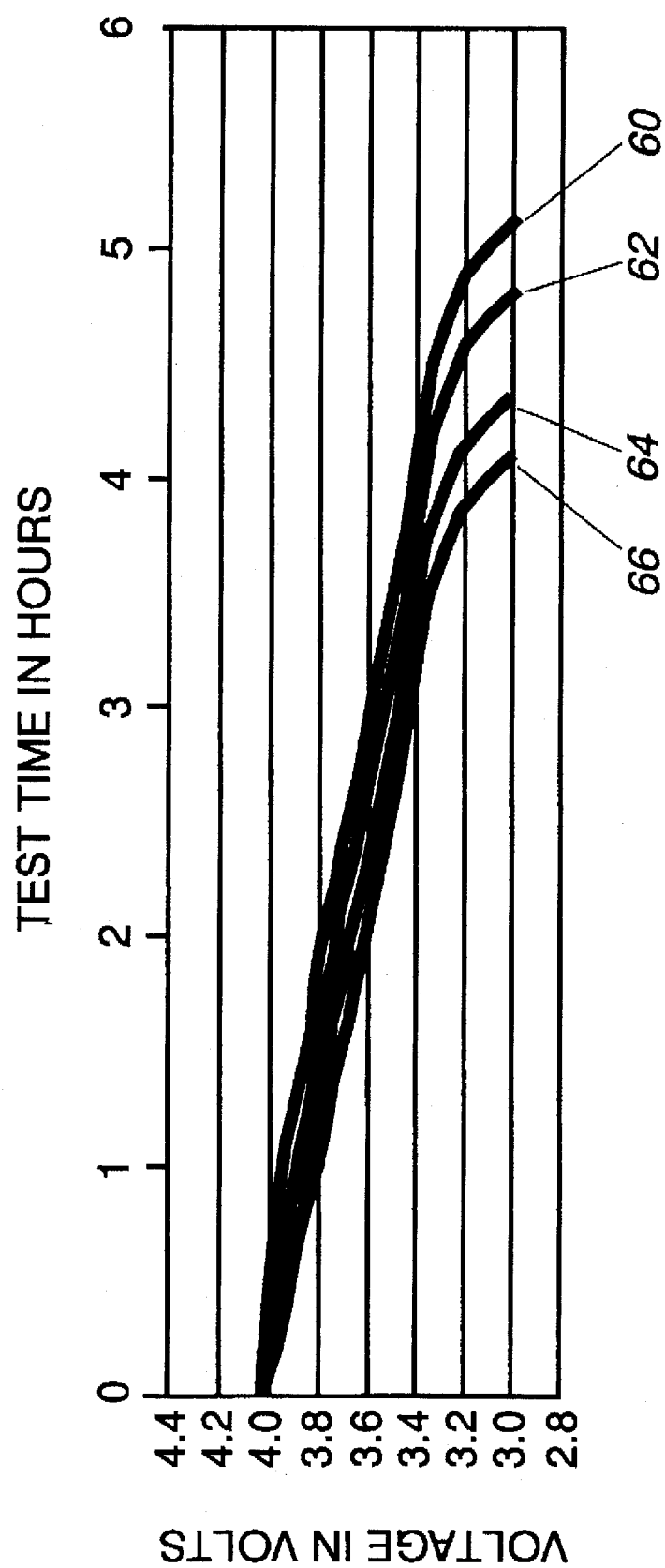
FIG. 3 is a chart illustrating the discharge profile for a cell fabricated using an electrolyte system, in accordance with the instant invention.

An electrochemical cell was fabricated using a carbon anode fabricated of commercially available graphite, and a cathode fabricated of commercially available $LiCoO_2$, with a non woven structure as described above disposed therebetween. The stacked anode-non woven-cathode structure was then wetted with an electrolyte active species comprising $1M LiPF_6$ in EC/DEC (40:60) solvent. Discharge profiles for the first four cycles are illustrated by lines 60, 62, 64, and 66 respectively of FIG. 3.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A polymer gel electrolyte system for use in an electrochemical cell having positive and negative electrodes, said polymer gel electrolyte system comprising:

an electrolyte active species adapted to promote ion transport between said positive and said negative electrodes; and a polymer support structure comprising an inert, non woven first polymer component and a gelling second polymer component, said gelling second polymer selected from the group consisting of polyvinylidene fluoride (PVDF), polyurethane, polyvinyl acetate, polyvinylpyrrolidinone, copolymers of any of the foregoing, and combinations thereof.

2. A gel electrolyte system as in claim 1, wherein said electrolyte active species is a liquid electrolyte which is absorbed by said gelling second polymer in said polymer support structure.

3. A gel electrolyte system as in claim 1, wherein said inert, first polymer is selected from the group consisting of polyethylene, polypropylene, polytetrafluoroethylene, polystyrene, polyethyleneterephthalate, nylon, and combinations thereof.

4. A gel electrolyte system as in claim 2, further including a solvent selected from the group consisting of propylene carbonate, ethylene carbonate, diethyl carbonate, dimethylcarbonate, dipropylcarbonate, dimethylsulfoxide, acetonitrile, dimethoxyethane, tetrahydrofuran, and combinations thereof.

5. A gel electrolyte system as in claim 2, wherein said electrolyte active species includes an alkali metal salt having the formula $M^+X^-$, where:

$M^+$ is an alkali metal cation selected from the group consisting of $Li^+$ and $Na^+$, $K^+$; and $X^-$ is a anion selected from the group consisting of $Cl^-$, $Br^-$, $I^-$, $ClO_4^-$, $BF_4^-$, $PF_6^-$, $AsF_6^-$, $SbF_6^-$, $CH_3CO_2^-$, $CF_3SO_3^-$, $(CF_3SO_2)_2N^-$, $(CF_3SO_2)_3C^-$, and combinations thereof.

6. A gel electrolyte system as in claim 1, wherein said electrolyte active species is $LiPF_6$, in an ethylene carbonate-containing organic solvent and wherein said polymer support structure includes a gelling polymer of polyvinylidene fluoride and a non woven polymer consisting of polypropylene.

7. A gel electrolyte system as in claim 1, wherein the gelling polymer comprises between 10 and 40 wt % of the polymer support structure.

8. A gel electrolyte system as in claim 1, wherein the gelling polymer preferably comprises between 15 and 25 wt % of the polymer support structure.

9. A polymer gel electrolyte system for use in an electrochemical cell having positive and negative electrodes, said polymer gel electrolyte system comprising:

a liquid electrolyte active species for promoting ion transport between said positive and said negative electrodes; and a polymer support structure including at least a non woven, first polymer for enhancing mechanical integrity of the polymer support structure, said first polymer selected from the group consisting of polyethylene, polypropylene, polytetrafluoroethylene, polystyrene, polyethyleneterephthalate, nylon, and combinations thereof, and a gelling second polymer for absorbing said electrolyte active species, said second polymer being selected from the group consisting of polyvinylidene fluoride (PVDF), polyurethane, polyvinyl acetate, polyvinylpyrrolidinone, copolymers of any of the foregoing, and combinations thereof.

10. A gel electrolyte system as in claim 9 wherein said liquid electrolyte active species further includes a solvent selected from the group consisting of propylene carbonate, ethylene carbonate, diethyl carbonate, dimethylcarbonate, dipropylcarbonate, dimethylsulfoxide, acetonitrile, dimethoxyethane, tetrahydrofuran, and combinations thereof.

11. A gel electrolyte system as in claim 9, wherein said liquid electrolyte active species includes an alkali metal salt having the formula $M^+X^-$, where:

$M^+$ is an alkali metal cation selected from the group consisting of $Li^+$ and $Na^+$, $K^+$; and $X^-$ is a anion selected from the group consisting of $Cl^-$, $Br^-$, $I^-$, $ClO_4^-$, $BF_4^-$, $PF_6^-$, $AsF_6^-$, $SbF_6^-$, $CH_3CO_2^-$, $CF_3SO_3^-$, $(CF_3SO_2)_2N^-$, $(CF_3SO_2)_3C^-$, and combinations thereof.

12. A gel electrolyte system as in claim 9, wherein said electrolyte active species is $LiPF_6$, in an organic solvent and wherein said polymeric support structure includes a first polymer consisting of polyethylene and a second polymer consisting of polyvinylidene fluoride.

13. A gel electrolyte system as in claim 9, wherein the second polymer comprises between 10 and 40 wt % of the polymer support structure.

14. A gel electrolyte system as in claim 9, wherein the second polymer comprises between 15 and 25 wt % of the polymer support structure.

* * * * *